(12) United States Patent
Kim et al.

(10) Patent No.: US 7,675,593 B2
(45) Date of Patent: Mar. 9, 2010

(54) DISPLAY PIXEL USING ELECTROACTIVE POLYMER AND DISPLAY APPARATUS EMPLOYING THE SAME

(75) Inventors: Jin-hwan Kim, Suwon-si (KR); Byoung-ho Cheong, Seoul (KR); Hong-seok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 11/875,265

(22) Filed: Oct. 19, 2007

(65) Prior Publication Data

US 2008/0291525 A1 Nov. 27, 2008

(30) Foreign Application Priority Data

May 23, 2007 (KR) .................. 10-2007-0050263

(51) Int. Cl.
*G02F 1/1335* (2006.01)
*G02F 1/29* (2006.01)
*G02B 26/00* (2006.01)

(52) U.S. Cl. .................. 349/114; 349/113; 349/201; 359/290; 359/291; 359/316

(58) Field of Classification Search ................ 349/106, 349/113, 114, 198, 201; 359/290, 291, 316
See application file for complete search history.

(56) References Cited

U.S. PATENT DOCUMENTS 6,798,472 B2 * 9/2004 Nagae ...................... 349/106
2007/0103620 A1 * 5/2007 Leu et al. ................... 349/106

OTHER PUBLICATIONS

Manuel Aschwanden and Andreas Stemmer, Polymeric, Electrically Tunable Diffraction Grating Based on Artificial Muscles, Optics letters, vol. 31, No. 17, Sep. 1, 2006 pp. 2610-2612.
Ron Pelrine, et al., High-Speed Electrically Actuated Elastomers with Strain Greater Than 100%, Science.vol. 287 Feb. 4, 2000, www.sciencemag.org, pp. 836-838.

* cited by examiner

*Primary Examiner*—Michael H Caley
(74) *Attorney, Agent, or Firm*—Sughrue Mion, PLLC

(57) ABSTRACT

Provided are a display pixel using an electroactive polymer and a display apparatus employing the display pixel. The display pixel includes: an electroactive polymer layer, of which shape and/or size is displaced when a voltage is applied thereto; a diffraction grating, of which a pitch and a diffraction angle change according to a displacement of the electroactive polymer layer; and a liquid crystal layer disposed on the diffraction grating and controlling gradation according to a voltage applied thereto.

18 Claims, 4 Drawing Sheets

DISPLAY PIXEL USING ELECTROACTIVE POLYMER AND DISPLAY APPARATUS EMPLOYING THE SAME

CROSS-REFERENCE TO RELATED PATENT APPLICATION

This application claims the benefit of Korean Patent Application No. 10-2007-0050263, filed on May 23, 2007, in the Korean Intellectual Property Office, the disclosure of which is incorporated herein in its entirety by reference.

BACKGROUND OF THE INVENTION

1. Field of the Invention

The present invention relates to a display pixel reflecting color light using an electroactive polymer, and a display apparatus employing the display pixel and displaying a color image.

2. Description of the Related Art

With the rapid development of communication technologies and display apparatuses, various kinds of portable terminals with a display unit have been introduced. Examples of the portable terminals include personal digital assistants (PDAs), portable multimedia players (PMPs), and digital multimedia broadcasting (DMB) phones. Liquid crystal displays (LCDs) are light-receiving flat panel displays (FPD) used in portable terminals or general display apparatuses. Because LCDs are not self-luminous, they display an image by modifying the transmittance of light emitted by a light source through each pixel. To this end, a backlight unit is installed at the back of the LCDs to emit light toward a liquid crystal panel.

Backlight units are classified into direct light type backlight units and edge light type backlight units according to the arrangement of light sources. Direct light type backlight units are configured such that a plurality of lamps disposed beneath a liquid crystal panel directly emit light onto the liquid crystal panel. The direct light type backlight units are suitable for large-sized display apparatuses of 30 inches or more, e.g., LCD TVs, because the light sources can be effectively located over a wide area with flexibility. Edge light type backlight units are configured such that a light source is located on a sidewall of a light guide plate (LGP). The edge light type backlight units are suitable for portable terminals because the light source is located only on the sidewall of the LGP.

Recently, interest is growing on display apparatuses that can display an image using sunlight or external illumination without charging the display apparatuses.

However, since LCDs using external light use a color filter to create a color image and the color filter transmits light having a specific wavelength and absorbs remaining light, light efficiency is low. Since the color filter is expensive, the LCDs are also expensive. Accordingly, there is a demand for a method of creating a color image without a color filter.

SUMMARY OF THE INVENTION

The present invention provides a display pixel that reflects color light using an electroactive polymer.

The present invention also provides a display apparatus that displays a color image by reflecting external light as color light using an electroactive polymer.

According to an aspect of the present invention, there is provided a display pixel including: an electroactive polymer layer, of which shape and/or size is displaced when a voltage is applied thereto; a diffraction grating, of which a pitch and a diffraction angle change according to a displacement of the electroactive polymer layer; and a liquid crystal layer which is disposed to cover the diffraction grating and controls gradation according to a voltage applied thereto.

The diffraction grating may be formed of a flexible conductive material.

The pixel further comprises a thin film transistor (TFT) electrode, which applies a voltage to the liquid crystal layer. The diffraction grating may be used as a top electrode of the TFT electrode.

The display pixel may further comprise a first and a second electrodes which each are formed of a flexible material and disposed on a bottom surface and on a top surface of the electroactive polymer layer, respectively, wherein the first and the second electrodes apply a voltage to the electrode active polymer layer and undergo deformation according to the displacement of the Electroactive polymer layer.

The electroactive polymer layer and the diffraction grating may be disposed in the liquid crystal layer.

The electroactive polymer layer may have a thickness ranging from 0.001 to 100 μm.

According to another aspect of the present invention, there is provided a display apparatus including a plurality of pixels, wherein each of the plurality of pixels comprises: a backlight unit emitting light; a liquid crystal layer controlling transmittance of the light emitted by the backlight unit according to a voltage applied to the liquid crystal layer; a reflective color unit including: an electroactive polymer layer, of which shape and/or size is displaced when a voltage is applied thereto; and a diffraction grating, of which a pitch and a diffraction angle change according to a displacement of the electroactive polymer layer; and a transmissive color unit including a color filter transmitting light having a specific wavelength among the light emitted by the backlight unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
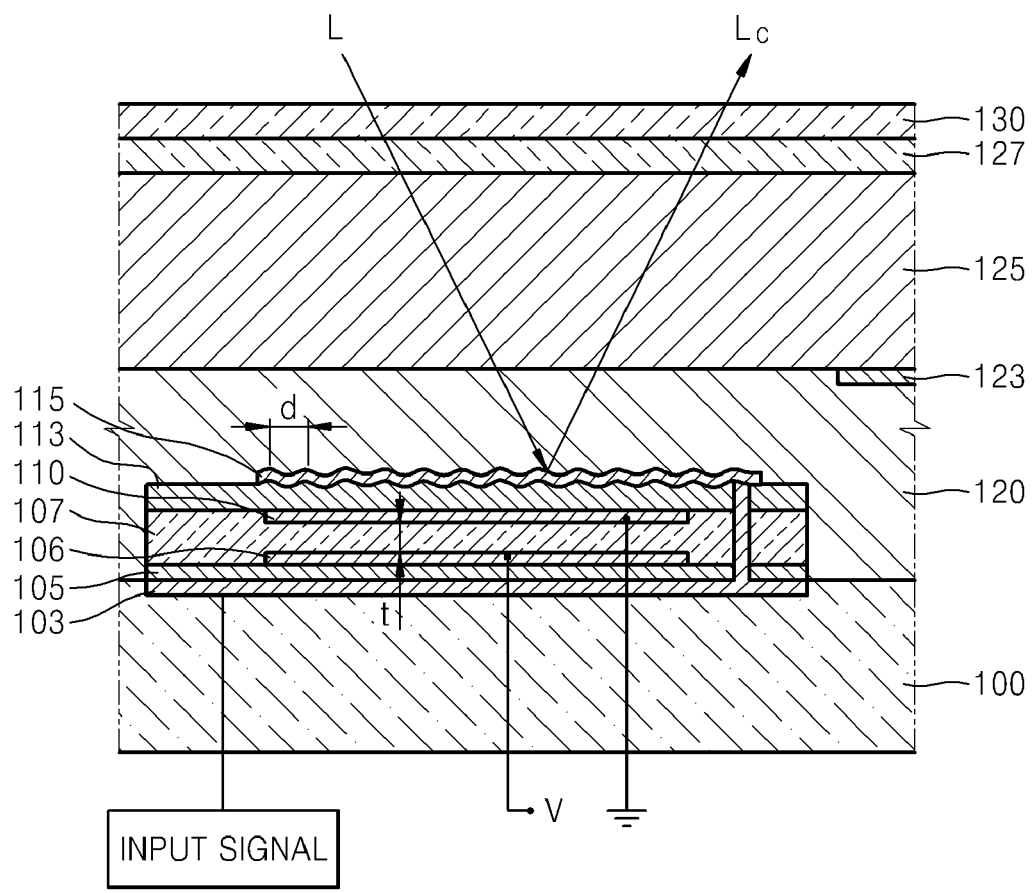
FIG. 1 is a cross-sectional view of a subpixel of a color display apparatus using an electroactive polymer according to an embodiment of the present invention.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

It will be understood that when an element or layer is referred to as being "on" another element or layer, the element or layer can be directly disposed on another element or layer with or without intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below" or "lower" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings, in which exemplary embodiments of the invention are shown.

A display apparatus according to the present invention reflects external light as color light using an electroactive polymer.

FIG. 1 is a cross-sectional view of a subpixel of a display apparatus according to an embodiment of the present invention. A plurality of pixels each including a plurality of subpixels are arranged in a matrix and output different color light according to input signals to display a color image. Each of the plurality of subpixels includes an electroactive polymer layer 107, a diffraction grating 115 disposed on the electroactive polymer layer 107, and a liquid crystal layer 120 disposed on the diffraction grating 115 and controlling gradation.

The electroactive polymer layer 107 may be formed on a substrate 100. A thin film transistor (TFT) electrode 103 applying a voltage to the liquid crystal layer 120 and an insulating layer 105 may be disposed between the substrate 100 and the electroactive polymer layer 107. The TFT electrode 103 may include a TFT bottom electrode disposed under the electroactive polymer layer 107 and a TFT top electrode disposed over the electroactive polymer layer 107. The diffraction grating 115 is formed of a conductive material and is used as the TFT top electrode of the TFT electrode 103. The TFT bottom electrode and the diffraction grating 115 are electrically connected to each other. The electroactive polymer layer 107 and the diffraction grating 115 may be disposed in the liquid crystal layer 120, and more specifically may be disposed in middle and lower parts of the liquid crystal layer 120.

A transparent substrate 125 is disposed on the liquid crystal layer 120, and a quarter wave plate 127 and a polarization film 130 are disposed on the transparent substrate 125. The transparent substrate 125 may be formed of glass or polyethylene terephthalate (PET). A black matrix 123 may be disposed between adjacent pixels. The black matrix 123 absorbs light emitted from an adjacent pixel to prevent light reflected by the diffraction grating 115 from traveling to the adjacent pixel and from resulting in color blending. The black matrix 123 may be disposed in a side of an upper part of the liquid crystal layer 120.

According to the present embodiment, the displacement of the electroactive polymer layer 107 causes or induces the deformation of the diffracting grating 115. Thus deformed diffracting grating 115 and displaced the electroactive polymer layer 107 cooperate to emit color light, and the liquid crystal layer 120 controls gradation, thereby creating a color image.

Referring to FIG. 1, a color reflecting unit 10 includes the electroactive polymer layer 107 and the diffraction gating 115 disposed on the electroactive polymer layer 107. External light L is reflected by the diffraction grating 115 and emitted as color light $L_c$. The wavelength of the color light $L_c$ varies depending on the pitch d of the diffraction grating 115, and the pitch d of the diffraction grating 115 is controlled by the electroactive polymer layer 107.

Displacement of the electroactive polymer layer 107 occurs when a voltage is applied thereto. A first electrode 106 and a second electrode 110 apply a voltage to the electroactive polymer layer 107. Once a voltage is applied to the electroactive polymer layer 107, a stress is applied to the electroactive polymer layer 107 due to an electric field generated between the first electrode 106 and the second electrode 110, and thus the electroactive polymer 107 is displaced in its shape and size due to the stress. The electroactive polymer is a polymer which responds to external electrical stimulation by displaying a significant shape or size displacement. The properties and types of an electroactive polymer are disclosed in R. Pelrine, et. al., Science. 287, 836 (2000), the content of which is incorporated herein by reference. For the purpose of generating an electric field over as much area as possible, the first electrode 106 may be disposed under the electroactive polymer layer 107 and the second electrode 110 may be disposed over the electroactive polymer layer 107 such that the electroactive polymer layer 107 is sandwiched between the first electrode 106 and the second electrode 107. Each of the first electrode 106 and the second electrode 110 may be formed of a flexible material so that they can be deformed when the electroactive polymer layer 107 is strained. The degree of displacement of the electroactive polymer layer 107 varies depending on the kind of polymer used. A relationship between strain and polymer is shown in Table 1.

Table 1

Figure 2:
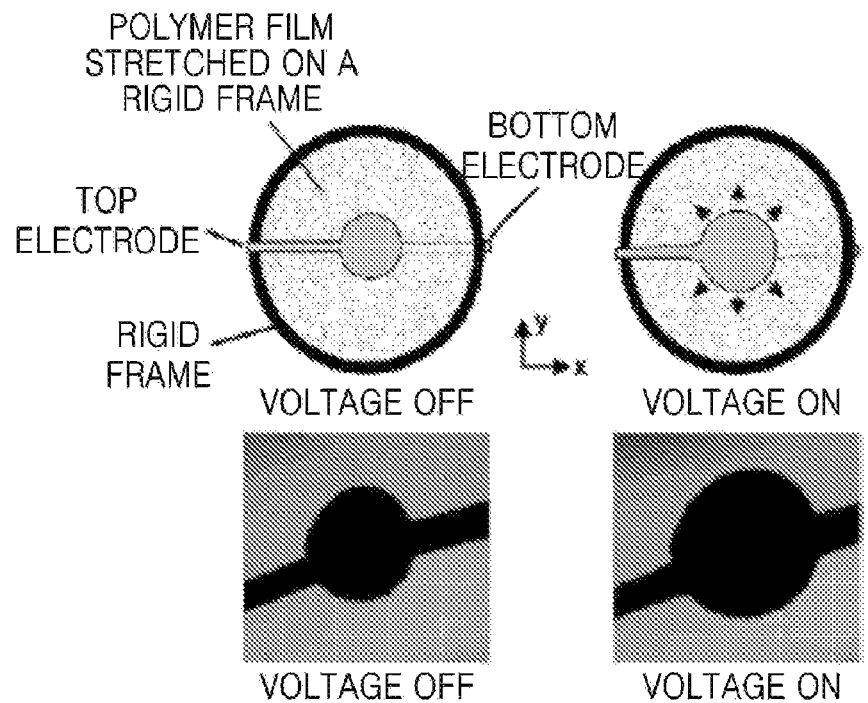
FIG. 2 illustrates a circular displacement occurring when a voltage is applied to the electroactive polymer of a color reflecting unit of the color display apparatus of FIG. 1.
Figure 3:
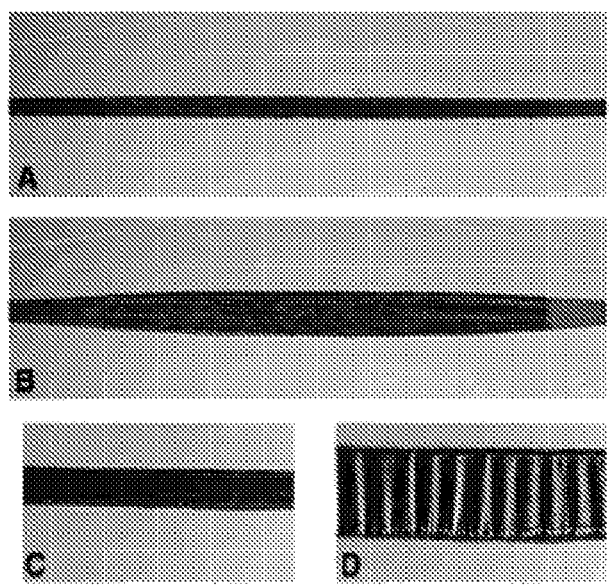
FIG. 3 illustrates a linear displacement occurring when a voltage is applied to the electroactive polymer of the color reflecting unit of the color display apparatus of FIG. 1.

In order to increase the degree of displacement of an electroactive polymer, a pre-strain or pre-displacement may be applied. Upon a circular or linear pre-strain is applied, the size of the electroactive polymer is increased. FIG. 2 illustrates an electroactive polymer before and after a voltage is applied to the electroactive polymer. When a circular pre-strain is applied and then a voltage is applied, the size of the electroactive polymer is increased and thus electrodes are extended. FIG. 3 illustrates an electroactive polymer when a linear pre-strain is applied and then a voltage is applied. Referring to FIG. 3, the size of the electroactive polymer is increased from A to B, and from C to D.

The diffraction grating 115, which is disposed on the electroactive polymer layer 107, is deformed according to the displacement of the electroactive polymer layer 107. The diffraction grating 115 may be formed of a flexible material that can be deformed in accordance with the displacement of the electroactive polymer layer 107. The diffraction grating 115 may be formed of a high reflective material, such as Al or Au, which can reflect incident light. The degree of displacement of the electroactive polymer layer 107 increases as a voltage applied to the electroactive polymer layer 107 increases. The diffraction grating 115 is extended when the displacement of the electroactive polymer layer 107 occurs. A support layer 113 may be disposed between the electroactive polymer layer 107 and the diffraction grating 115.

When the pitch of the diffraction grating 115 when no voltage is applied to the electroactive polymer layer 107 is defined as d0 and the pitch of the diffraction grating 115 when a voltage V is applied to the electroactive polymer layer 107 is defined as d, the pitch d of the diffraction grating 115 is defined by the formula:

$$d = \frac{d_0}{\sqrt{1 - \varepsilon\varepsilon_0 \frac{V^2}{Yt^2}}} \quad (1)$$

wherein, $\in$ denotes the dielectric constant of the diffraction grating 115, $\in_0$ denotes the dielectric constant of air, Y denotes a Young's Modulus, and t denotes a distance between the first electrode 106 and the second electrode 110 (see FIG.

TABLE 1

Circular and linear strain test results.

| Material | Prestrain (x, y) (%) | Actuated relative thickness strain (%) | Actuated relative area strain (%) | Field strength (MV/m) | Effective compressive stress (MPa) | Estimated ½e (MJ/m³) |
|---|---|---|---|---|---|---|
| Circular strain | | | | | | |
| HS3 silicone | (68, 68) | 48 | 93 | 110 | 0.3 | 0.098 |
| | (14, 14) | 41 | 69 | 72 | 0.13 | 0.034 |
| CF19-2186 silicone | (45, 45) | 39 | 64 | 350 | 3.0 | 0.75 |
| | (15, 15) | 25 | 33 | 160 | 0.6 | 0.091 |
| VHB 4910 acrylic | (300, 300) | 61 | 158 | 412 | 7.2 | 3.4 |
| | (15, 15) | 29 | 40 | 55 | 0.13 | 0.022 |
| Linear strain | | | | | | |
| HS3 | (280, 0) | 54 | 117 | 128 | 0.4 | 0.16 |
| CF19-2186 | (100, 0) | 39 | 63 | 181 | 0.8 | 0.2 |
| VHB 4910 | (540, 75) | 68 | 215 | 239 | 2.4 | 1.36 |

1). Accordingly, the pitch d of the diffraction grating 115 can be controlled by changing the voltage V applied to the electroactive polymer layer 107 and the distance t between the first electrode 106 and the second electrode 110. As the voltage V increases, the pitch d of the diffraction grating 115 increases. As the distance t between the first electrode 106 and the second electrode 110 increases, the pitch d of the diffraction grating 115 decreases. If the electroactive polymer layer 107 is thick, the displacement of the electroactive polymer layer 107 occurs only when a high voltage is applied. Accordingly, the electroactive polymer layer 107 may have a thickness ranging from 0.001 μm to 100 μm.

Figure 4A:
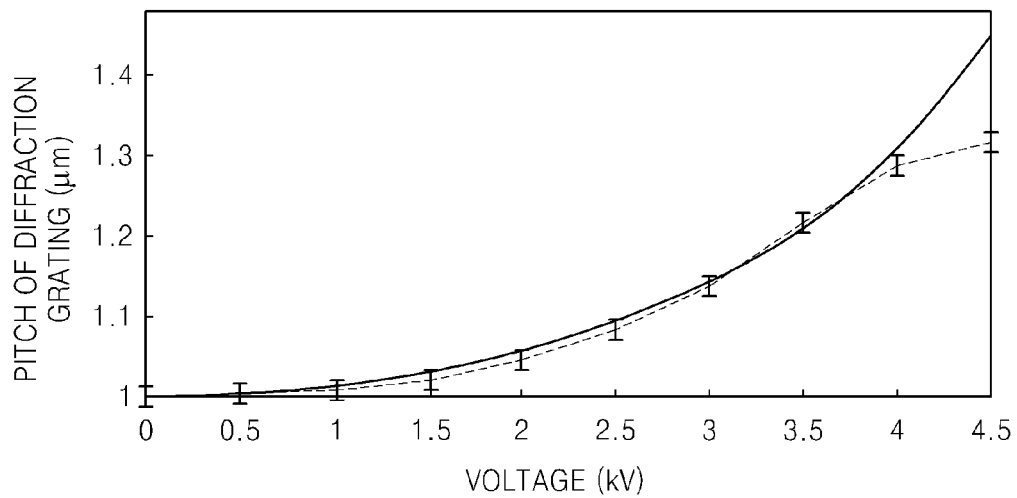
FIG. 4A is a graph illustrating a relationship between a voltage applied to an electroactive polymer layer and the pitch of a diffraction grating of the color reflecting unit of the color display apparatus of FIG. 1.
Figure 4B:
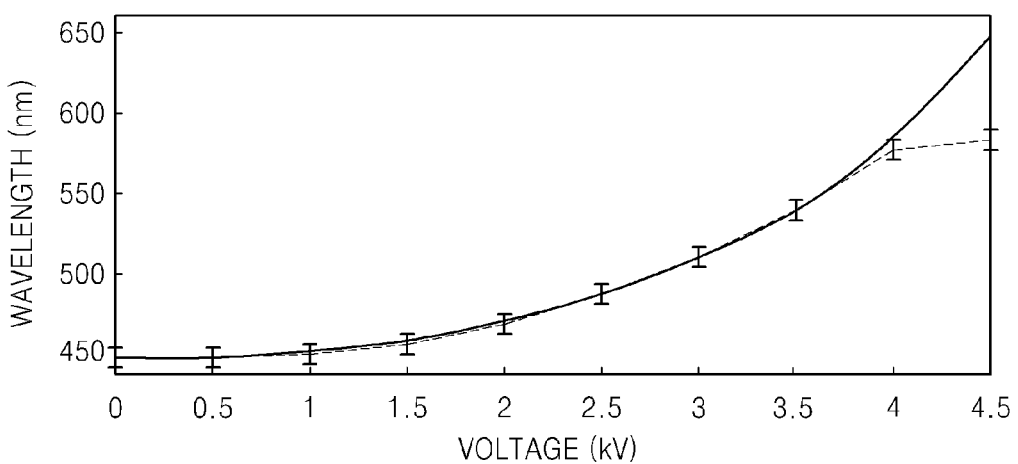
FIG. 4B is a graph illustrating a relationship between a voltage applied to the electroactive polymer layer and the wavelength of light reflected by the diffraction grating of the color reflecting unit of the color display apparatus of FIG. 1.

FIG. 4A illustrates a relationship between a voltage applied to the electroactive polymer layer 107 and the pitch of the diffraction grating 115 of the color display apparatus of FIG. 1. The diffraction grating 115 may be a reflective diffraction grating reflecting incident light such that the wavelength of light reflected by the diffraction grating 115 varies depending on the pitch of the diffraction grating 115. When a voltage is applied to the electroactive polymer layer 107, displacement of the electroactive polymer layer 107 occurs, the diffraction grating 115 is extended accordingly, and the pitch of the diffraction grating 115 is increased. Once the pitch of the diffraction grating 115 is increased, the diffraction grating 115 reflects light having a larger wavelength than that of incident light. FIG. 4B illustrates a relationship between a voltage applied to the electroactive polymer layer 107 and the wavelength of light reflected by the diffraction grating 115 of the color display apparatus of FIG. 1. It is found from FIG. 4B that the wavelength of light reflected by the diffraction grating 115 can be adjusted by controlling the voltage applied to the electroactive polymer layer 107. In FIGS. 4A and 4B, dotted lines represent measurements and solid lines represent calculations. It is disclosed in M. Aschwanden and A. Stemmer, Opt. Lett. 31(17), 2610 (2006), of which the content is incorporated herein by reference, that the wavelength of light reflected by a diffraction grating varies depending on a voltage applied to an electroactive polymer layer. The color display apparatus of FIG. 1 uses these properties of electroactive polymers.

The color display apparatus of FIG. 1 includes a plurality of pixels. Each of the plurality of pixels has a plurality of subpixels. Since the subpixels output different color light according to input signals, gradation is produced. The display apparatus of FIG. 1 employs the color reflecting unit 10 containing an electroactive polymer, which is strained when a voltage applied to the electroactive polymer, and creates a color image.

The operation of the color display apparatus of FIG. 1 will now be explained in detail.

The respective subpixels have an identical structure, and different color light is emitted by controlling voltages applied to the liquid crystal layer 120 and to the electroactive polymer layer 107. Referring to FIG. 1, a first voltage V1 is applied to the liquid crystal layer 120 by the TFT electrode 103. A second voltage V2 is applied to the electroactive polymer layer 107 by the first electrode 106 and the second electrode 110 according to an image signal input from a control unit (not shown) of the color display apparatus. Among external light incident on the color display apparatus, only light having a specific polarization is transmitted through the polarization film 130, and is converted into circularly polarized light by the quarter wave plate 127. For example, P-polarized light may be transmitted through the polarization film 130 and may be converted into right circularly polarized light by the quarter wave plate 127. Light passing through the transparent substrate 125 is incident on the liquid crystal layer 120 by which the transmittance of the light is controlled according to the first voltage V1, and then is incident on the diffraction grating 115. The wavelength of light reflected by the diffraction grating 115 is controlled according to the second voltage V2. Light having a desired wavelength is reflected by the diffraction grating 115, passes through the liquid crystal layer 120 and the transparent substrate 125, and then is incident on the quarter wave plate 127. Light converted into left circularly polarized light by the quarter wave plate 127 is converted into P-polarized light by the polarization film 130 and emitted to the outside of the color display apparatus.

For example, when one pixel includes first through third subpixels and second voltages V2a, V2b, and V2c are respectively applied to the first through third subpixels, light having a larger wavelength is reflected by the diffraction grating 115 as a higher voltage is applied. For example, when the second voltages V2a, V2b, and V2c satisfying a relationship of V2a>V2b>V2c are applied, red light, green light, and blue light may be reflected by the diffraction grating 115. The different color light emitted by the first through third subpixels is combined to produce desired color light.

Since the respective subpixels have the same structure and the different color can be emitted by controlling only the voltages applied to the electroactive polymer layer 107, the color display apparatus can be easily manufactured at low cost. Also, since the color display apparatus does not absorb light, light efficiency is higher than a color display apparatus that creates a color image using a color filter.

Figure 5:
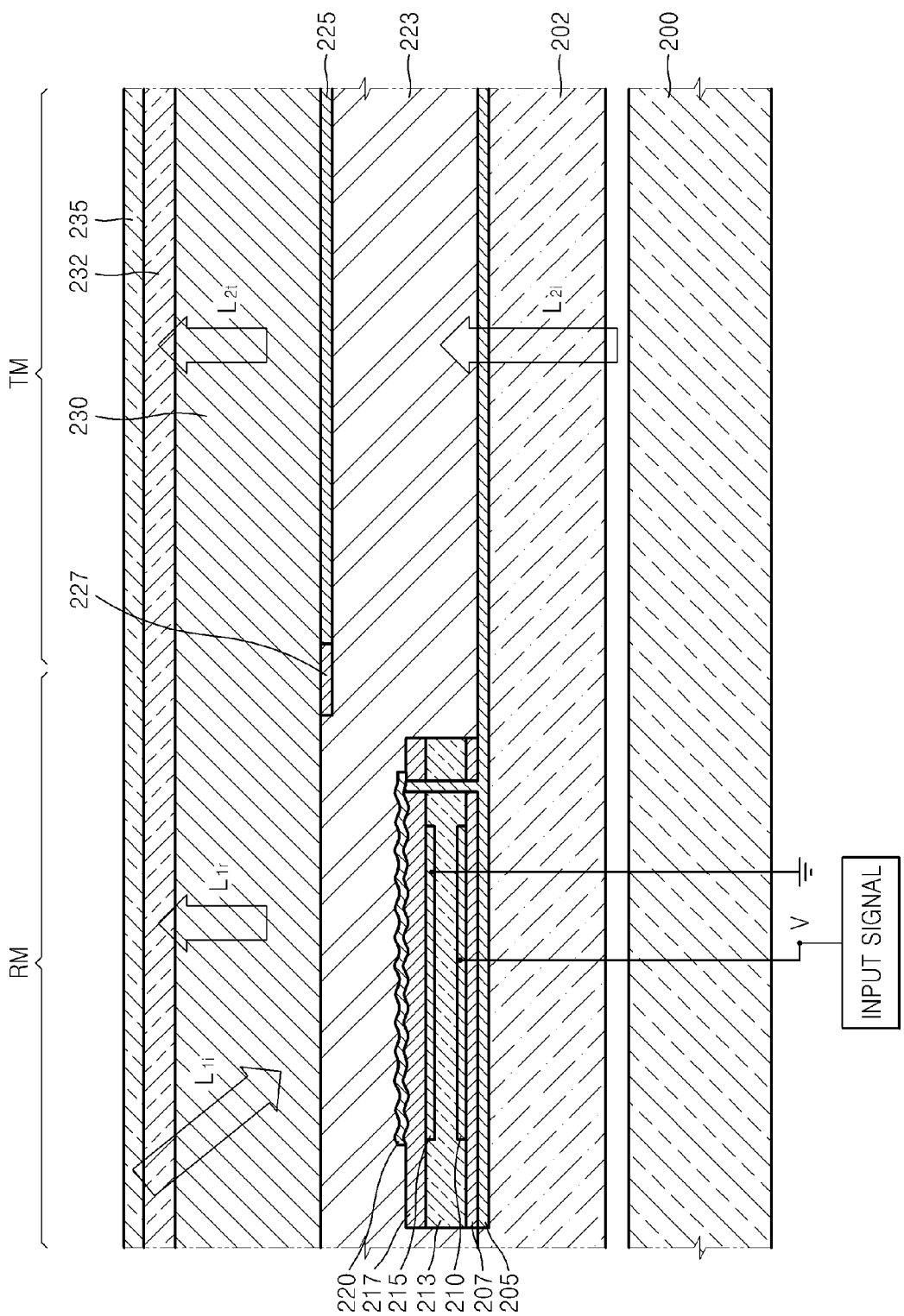
FIG. 5 is a cross-sectional view of a subpixel of a color display apparatus using an electroactive polymer according to another embodiment of the present invention.

FIG. 5 is a cross-sectional view of a color display apparatus according to another embodiment of the present invention. Referring to FIG. 5, the color display apparatus includes a plurality of pixels each including a plurality of subpixels. Each of the plurality of subpixels includes a reflective color unit RM which reflects external light and displays a color image, and a transmissive color unit TM which transmits light emitted by a backlight unit 200 and displays a color image. Since respective subpixels have the same structure, only one subpixel will now be explained.

The reflective color unit RM has the same construction as that of the color display apparatus of FIG. 1. The reflective color unit RM includes an electroactive polymer layer 213 of which size and/or shape is displaced when a voltage is applied thereto, and a diffraction grating 220 whose pitch is changed according to the displacement of the electroactive polymer layer 213 to change the diffraction angle and wavelength of light reflected thereby. The diffraction grating 220 reflects light having a certain wavelength as color light among external light with the help of the electroactive polymer layer 213.

A first electrode 210 and a second electrode 215 are respectively disposed under and over the electroactive polymer layer 213 to apply a voltage to the electroactive polymer layer 213. A liquid crystal layer 223, which also extends to TM area, is disposed on the diffraction grating 220, and a TFT electrode 205 applying a voltage to the liquid crystal layer 223 may be disposed under the electroactive polymer layer 213. An insulating layer 207 is disposed between the first electrode 210 and the TFT electrode 205. A support layer 217 may be disposed between the second electrode 215 and the diffraction grating 220. The electroactive polymer layer 213 and the diffraction grating 220 may be disposed in the liquid crystal layer 223, and more specifically may be disposed in middle and bottom areas of the liquid crystal layer 223. A substrate 202 may be disposed under the TFT electrode 205.

A transparent substrate 230, a quarter wave plate 232, and a polarization film 235 are disposed on the liquid crystal layer 223. The backlight unit 200 is disposed below the substrate 202. Light emitted by the backlight unit 200 is not used by the reflective color unit RM, but used by the transmissive color unit TM. The backlight unit 200 may be a direct light type backlight unit or an edge light type backlight unit.

The transmissive color unit TM includes a color filter 225 transmitting light having a certain wavelength among light emitted by the backlight unit 200. The liquid crystal layer 223 controls the transmittance of light $L_{2i}$ emitted by the backlight unit 200 and transmits the light $L_{21}$ according to an input signal. The color filter 225 transmits light having a certain wavelength among light transmitted through the liquid crystal layer 223. The substrate 202, and the TFT electrode 205 applying a voltage to the liquid crystal layer 223 are disposed between the liquid crystal layer 223 and the backlight unit 200. The transparent substrate 230, the quarter wave plate 232, and the polarization film 235 are disposed on the color filter 225.

The backlight unit 200 emitting light, and the substrate 202, the TFT electrode 205, the liquid crystal layer 223, the transparent substrate 230, the quarter wave plate 232, and the polarization film 235 disposed on the backlight unit 200 are shared by the reflective color unit RM and the transmissive color unit TM. However, light emitted by the backlight unit 200 is used by only the transmissive color unit TM, and is not used by the reflective color unit RM. The electroactive polymer layer 213 and the diffraction grating 220, which constitute parts of the reflective color unit RM only, are disposed in a part of the liquid crystal layer 223, and the color filter 225 for only the transmissive color unit TM is disposed in the other part of the liquid crystal layer 223. A black matrix 227 may be disposed at an upper part of the liquid crystal layer 223 between the reflective color unit RM and the transmissive color unit TM to block light emitted from an adjacent pixel.

In the reflective color unit RM, external light $L_{1i}$ passes through the polarization film 235, the quarter wave plate 232, and the transparent substrate 230, and is incident on the liquid crystal layer 223. The liquid crystal layer 223 controls the transmittance of light according to a first voltage V1 applied by the TFT electrode 205. Light transmitted through the liquid crystal layer 223 is incident on the diffraction grating 220. The pitch of the diffraction grating 220 changes according to a second voltage V2 applied by the first and second electrodes 210 and 215 to the electroactive polymer layer 213, and thus light having a certain wavelength is reflected as color light $L_{1r}$ by the diffraction grating 220.

In the transmissive color unit TM, light $L_{2i}$ emitted by the backlight unit 200 passes through the substrate 202 and the TFT electrode 205, and is incident on the liquid crystal layer 223. The liquid crystal layer 223 controls the transmittance of light according to a first voltage V1 applied thereto by the TFT electrode 202. Light transmitted through the liquid crystal layer 223 is incident on the color filter 225. Only light $L_{2t}$ having a predetermined wavelength is transmitted through the color filter 225, passes through the transparent substrate 230, the quarter wave plate 232, and the polarization film 235, and is output to the outside of the color display apparatus.

Since the color display apparatus of FIG. 5 includes the reflective color unit RM, which creates a color image using external light, and the transmissive color unit TM, which creates a color image using light emitted by the backlight unit 200, the external light or the light emitted by the backlight unit 200 can be selectively used. When external light is not sufficient to display an image, the backlight unit 200 can be turned on and the transmissive color unit TM can be used together with the reflective color unit RM.

As described above, the display pixel and the color display apparatus employing the display pixel emit color light using the electroactive polymer layer and the diffraction grating. Since the plurality of subpixels have the same structure and different color light can be emitted by controlling only voltages applied to the electroactive polymer layer, the color display apparatus can be easily manufactured in volume at low cost, unlike an existing color display apparatus using an expensive color filter. Since the existing color display apparatus using the color filter transmits only light having a predetermined wavelength and absorbs remaining light, light efficiency is low. However, since the color unit according to embodiments of the present invention is reflective, its light efficiency is improved.

Furthermore, since an image is formed using external light, the color display apparatus can be used at any location, thereby improving its portability. In addition, the color display apparatus can be applied to large-sized billboards installed outdoors or demonstration displays installed under bright illumination. Also, since a color image is formed using external light, energy consumption is low.

Moreover, since the color display apparatus employs both the reflective color unit using external light and the transmissive color unit using light emitted by the backlight unit, the external light or the backlight unit can be selectively used and thus user convenience can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display pixel comprising:
   an electroactive polymer layer, of which shape and/or size is displaced when a voltage is applied thereto;
   a diffraction grating, of which a pitch changes according to a displacement of the electroactive polymer layer; and
   a liquid crystal layer which is disposed on the diffraction grating and controls gradation according to a voltage applied thereto by a thin film transistor (TFT) electrode.

2. The display pixel of claim 1, wherein the diffraction grating is formed of a flexible conductive material.

3. The display pixel of claim 1, wherein the diffraction grating is used as a top electrode of the TFT electrode.

4. The display pixel of claim 1, further comprising a first and a second electrodes which each are formed of a flexible material and disposed on a bottom surface and on a top surface of the electroactive polymer layer, respectively, wherein the first and second electrodes apply a voltage to the electroactive polymer layer and undergo deformation according to the displacement of the electroactive polymer layer.

5. The display pixel of claim 1, wherein the electroactive polymer layer and the diffraction grating are disposed in the liquid crystal layer.

6. The display pixel of claim 1, wherein the electroactive polymer layer has a thickness ranging from 0.001 μm to 100 μm.

7. A display apparatus comprising a plurality of pixels, wherein each of the plurality of pixels comprises:
   an electroactive polymer layer, of which shape and/or size is displace when a voltage is applied;
   a diffraction grating, of which a pitch changes according to a displacement of the electroactive polymer layer; and
   a liquid crystal layer which is disposed on the diffraction grating and controls gradation according to a voltage applied thereto by a thin film transistor (TFT) electrode.

8. The display apparatus of claim 7, wherein the diffraction grating is formed of a flexible conductive material.

9. The display apparatus of claim 7, wherein the diffraction grating is used as a top electrode of the TFT electrode.

10. The display apparatus of claim 7, wherein the electroactive polymer layer has a thickness ranging from 0.001 μm to 100 μm.

11. A display pixel comprising:
    a backlight unit emitting light;

a liquid crystal layer controlling transmittance of the light emitted by the backlight unit according to a voltage applied to the liquid crystal layer;

a thin film transistor (TFT) electrode which applies the voltage to the liquid crystal;

a reflective color unit, which comprises:

an electroactive polymer layer, of which shape and/or size is displaced when a voltage is applied thereto; and a diffraction grating, of which a pitch changes according to a displacement of the electroactive polymer layer; and a transmissive color unit including a color filter transmitting light having a predetermined wavelength among the light emitted by the backlight unit.

12. The display pixel of claim 11, wherein the diffraction grating is formed of a flexible conductive material.

13. The display pixel of claim 11, wherein the diffraction grating is used as a top electrode of the TFT electrode.

14. The display pixel of claim 11, further comprising a first and a second electrodes which each are formed of a flexible material and apply a voltage to the electroactive polymer layer.

15. The display pixel of claim 11, wherein the electroactive polymer layer has a thickness ranging from 0.001 μm to 100 μm.

16. A display apparatus comprising a plurality of pixels, wherein each of the plurality of pixels comprises:

a backlight unit emitting light;

a liquid crystal layer controlling transmittance of the light emitted by the backlight unit according to a voltage applied to the liquid crystal layer;

a thin film transistor (TFT) electrode which applies the voltage to the liquid crystal;

a reflective color unit, which comprises:

an electroactive polymer layer, of which shape and/or size is displaced when a voltage is applied thereto; and a diffraction grating, of which a pitch changes according to a displacement of the electroactive polymer layer; and a transmissive color unit including a color filter transmitting light having a specific wavelength among the light emitted by the backlight unit.

17. The display apparatus of claim 16, wherein the diffraction grating is formed of a flexible conductive material.

18. The display apparatus of claim 16, wherein the diffraction grating is used as a top electrode of the TFT electrode.

* * * * *